United States Patent [19]

Mahajan

[11] Patent Number: 5,437,012
[45] Date of Patent: Jul. 25, 1995

[54] SYSTEM FOR UPDATING DIRECTORY INFORMATION AND DATA ON WRITE ONCE MEDIA SUCH AS AN OPTICAL MEMORY CARD

[75] Inventor: Rakesh Mahajan, Laguna Hills, Calif.

[73] Assignee: Canon Information Systems, Inc., Costa Mesa, Calif.

[21] Appl. No.: 47,663

[22] Filed: Apr. 19, 1993

[51] Int. Cl.⁶ .............................................. G06F 12/00
[52] U.S. Cl. .................................................. 395/164
[58] Field of Search .................... 235/454; 369/58, 59, 369/100; 395/400, 425, 500, 600, 775

[56] References Cited

U.S. PATENT DOCUMENTS

| | | | |
|---|---|---|---|
| 4,682,318 | 7/1987 | Busby | 369/59 |
| 4,910,725 | 3/1990 | Drexler et al. | 369/275 |
| 4,979,159 | 12/1990 | Tsuruoka et al. | 369/58 |
| 5,034,914 | 7/1991 | Osterlund | 395/425 |
| 5,073,887 | 12/1991 | Takagi et al. | 369/100 |
| 5,113,061 | 5/1992 | Tanaka | 235/454 |
| 5,218,685 | 6/1993 | Jones | 395/425 |
| 5,288,982 | 2/1994 | Hosoya | 235/454 |

FOREIGN PATENT DOCUMENTS 63-91887  4/1988  Japan .
3-36681   2/1991  Japan .

Primary Examiner—Mark R. Powell
Assistant Examiner—U. Chauhan
Attorney, Agent, or Firm—Fitzpatrick, Cella, Harper & Scinto

[57] ABSTRACT

A method and apparatus for updating data stored in a write once/read many memory which comprises creating a virtual image of data stored in the memory, updating data in the virtual image of the memory and designating updated data in the virtual image, and writing designated updated data from the virtual image to the memory. In the virtual image there is a main journal for organizing file information on the memory and file journals for each file stored on the memory. Each file journal contains self-describing information for its corresponding file.

29 Claims, 12 Drawing Sheets

```
WORD        wSize;      // size of struct in bytes  —50
WORD        CardMagic;  // to identify card
BYTE        CardType;   // type of card OC-20,OC-30  —44
CHAR        SerialNumber(6);  // driver generated, unique —43
CHAR        CardName(8);      // user provided, optional —45
CARD_FORMAT FormatInfo; —46
```
—41

```
WORD            wSize;       // size of struct in bytes — 52
LONG            lRevision;   // Revision # —53
LONG            lNextSector(7);  // next sector to allocate— 55
FILE_TABLE      StartOfFileTable —56
FILE_TABLE      DeletedFileTable; —57
BAD_SECTOR_TABLE BadSectorTable; —58
CHAR            Password(8); —59
```
—42

FIG.4

```
WORD    wSize;       // size of this struct in bytes —61
BYTE    bRevision;   // sector revision number; —62
BYTE    bUsageCount;
LPSTR   sbFileName;  // filename, size first —63
WORD    wExtentSize; // size of the extent —64
LONG    lNext;       // pointer to next extent —65
LONG    lDate;       // date of modification —67
LPSTR   sbUser;      // User area —68
```
—60

FIG. 6C USER VIEW OF DATA FOR FILE 1.XXX

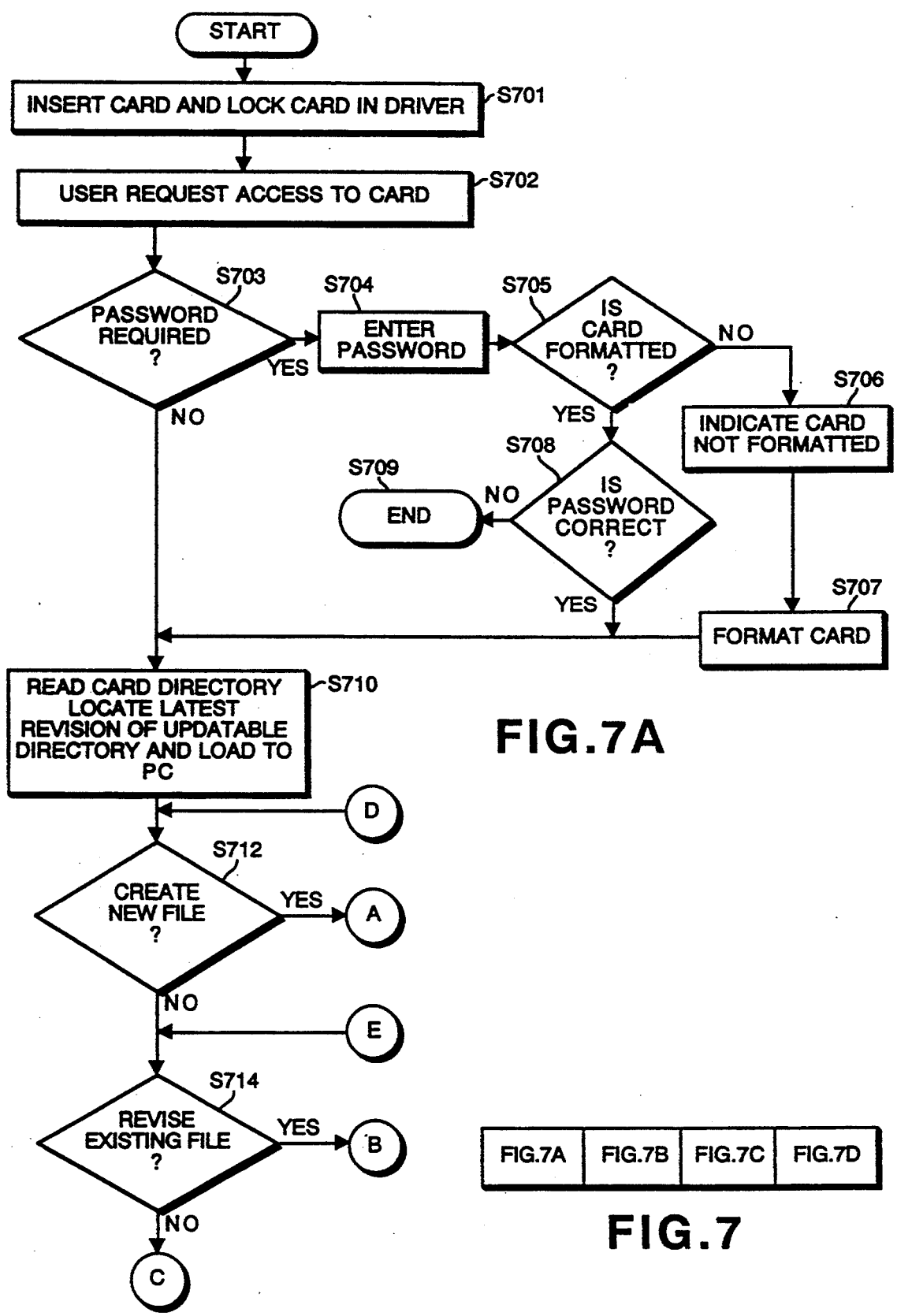

SYSTEM FOR UPDATING DIRECTORY INFORMATION AND DATA ON WRITE ONCE MEDIA SUCH AS AN OPTICAL MEMORY CARD

BACKGROUND OF THE INVENTION

1. Field of the Invention

The present invention pertains to a method and apparatus for updating portions of a write once/read many memory and for creating and updating self-describing file headers for data files stored on the memory. More particularly, the present invention relates to a method and apparatus for reducing the amount of data to be updated in a write once/read many memory card directory by providing a self-describing file header for each file within the write once/read many memory.

2. Description of the Related Art

With recent advances in technology, the storage capacity of write once/read many memory media has increased to a point where those media have become quite efficient and popular for storing various types of data. More specifically, write once/read many media such as optical memory cards are widely used to store text data, binary data, voice entry data, image data, and other multimedia data for many different applications. The health industry in particular has taken advantage of the various data storage capabilities of optical memory cards and has found that optical memory cards are convenient media for storing x-rays, patient text history, and voice commentary.

In addition to its ability to store multimedia data, an optical memory card has become popular because of its high density capacity for storing data and because it is a non-volatile medium for storing data thereon. The write once feature ensures that data once placed on the card cannot physically be deleted. This is of great value in preventing loss of data stored on these media.

Another feature of the optical memory card is its size. Generally, the size of the optical memory card is no larger than a standard credit card and therefore data stored on the card is easily transportable. For example, a patient may carry his/her medical history in a wallet or purse and deliver the medical history to a lab or a physician for review and update. The size of the card makes it also convenient to enter data onto the optical memory card at a physician's office or at a lab using a personal computer work station.

The full benefit of using write once/read many media such as optical cards has not heretofore been realized, however, because software programs interact with the media as if the media were a conventional floppy disk drive. For example, writes and reads are handled in a similar fashion as writes and reads to a floppy disk. But, treating an optical memory card as a floppy disk treats the card inefficiently because of physical differences between the mediums. For example, a floppy disk is a write many/read many medium whereas the optical memory card is a write once/read many medium. As a result, storage capacity on the optical memory card is wasted since interim file directories and data that are written to a floppy disk must be re-written each time on the optical memory card since the optical card is a write once medium. In some systems, the problem with emulating a floppy disk is that 344 bytes on the optical memory card are not addressed using some types of DOS floppy disk drives since those drives format a disk with 1,024 bytes per track rather than 1,368 bytes per track for an optical memory card.

Thus, it has not been considered possible to make updates to an optical memory card without having to rewrite an entire directory or a file to unwritten locations in the optical memory card. Consequently, conventional use of an optical memory card does not allow a user to utilize the storage space on an optical memory card to its fullest capacity since much of the card is used for rewriting directory information and updated files every time a revision is made, and much of the available bytes per track is not even accessible.

SUMMARY OF THE INVENTION

It is the object of the present invention to address the foregoing difficulties and to provide a system which uses write once/read many media such as optical memory cards more efficiently.

In one aspect of the present invention, there is provided a method and apparatus for updating data stored in a write once/read many memory which comprises creating a virtual image of data stored in the memory, updating data in the virtual image of the memory and designating updated data in the virtual image, and writing designated updated data from the virtual image to the memory.

In another aspect of the present invention, there is provided a method and an apparatus for maintaining a virtual image of an optical memory card in an external memory device which comprises storing data from the optical memory card to the external memory device, designating in the external memory device a file to be updated, updating data within the designated file stored in the external memory, updating a file on the optical memory card corresponding to the designated file in the external memory in accordance with an update to the designated file, and maintaining a virtual image of the optical memory card in the external memory device.

In another aspect of the present invention, there is provided a self-describing header which allows for higher reliability and better recovery of the files on the media as well as allowing smaller directory structures. This embodiment is a method and apparatus for storing and accessing information on an optical memory card which comprises formatting an optical memory card, creating a directory containing a start of file extent pointer and a next allocatable sector, and creating a header for each extent of each file, wherein the extent header contains self-describing attributes of the extent.

BRIEF DESCRIPTION OF THE DRAWINGS

FIG. 4 illustrates a format of a card directory;

FIG. 5 illustrates a format of a file header;

FIG. 6c is a perspective view of the appearance of files perceived by the user;

FIG. 7, which comprises FIGS. 7a, 7b, 7c, and 7d, shows a flow diagram which illustrates the operation of creating and updating card directory, files, extents, and file headers.

DETAILED DESCRIPTION OF THE PREFERRED EMBODIMENT

Figure 1:
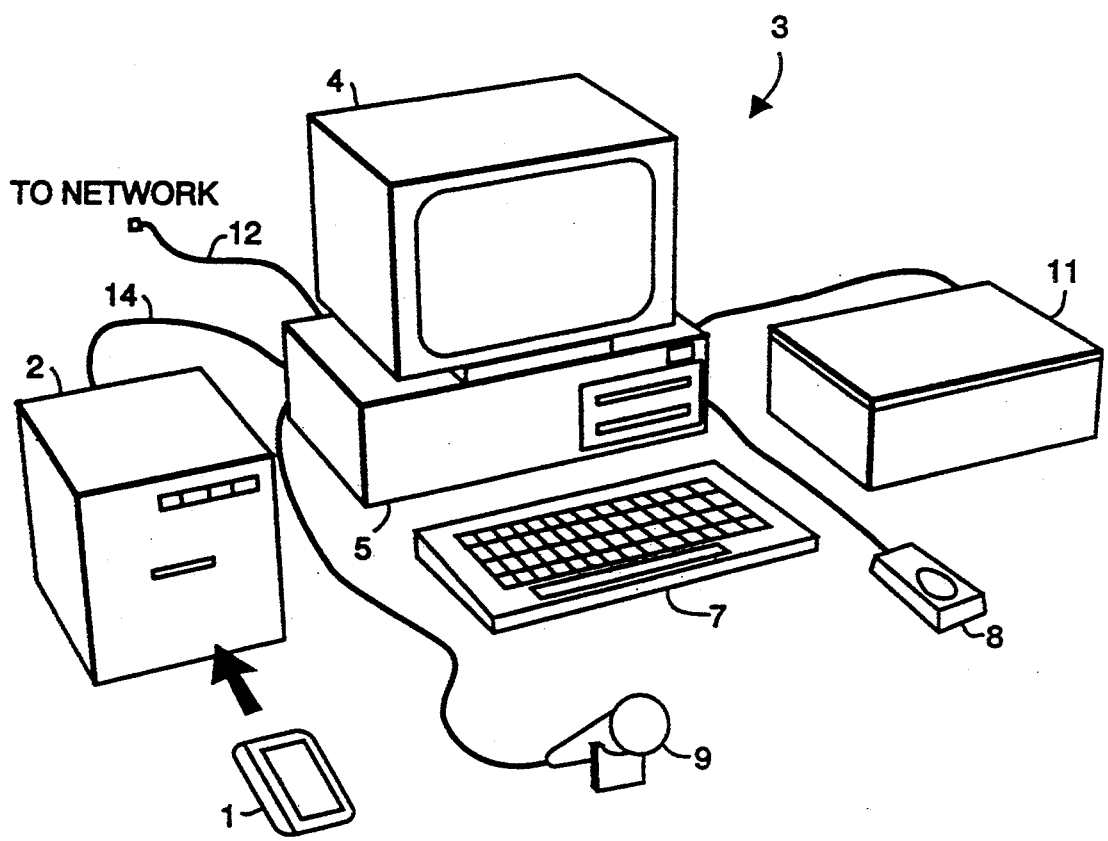
FIG. 1 is a representational view of a network system using an optical memory card.

FIG. 1 shows a networked system for creating and updating directory information and file data on a write once/read many medium such as an optical memory card.

As shown in FIG. 1, reference numeral 1 designates optical memory card 1 which may be a standard type optical card such as an optical card manufactured by Canon, Inc. Optical memory card 1 is inserted into optical drive 2 which receives optical memory card 1 and performs read/write operations to optical memory card 1. Optical drive 2 is connected to work station 3 which includes computing equipment such as an IBM PC or PC compatible computer 5. PC 5 includes a CPU such as an 80386 processor which executes stored program instructions such as operator selected application programs that are stored on the hard drive. Work station 3 further includes a local area network interface 12 which provides interface to a local area network whereby work station 3 can access files such as document files, voice or image files via a remote file server, or can access data via remote machines or equipment, such as an x-ray machine, or otherwise interface with a local area network in accordance with known techniques, such as by file exchange or by sending or receiving messages.

Work station 3 further includes a scanner 11 for producing image data, a keyboard 7 and mouse 8 for allowing user designations of areas on monitor 4, and user input of information. Work station 3 interfaces with optical drive 2 via a software application program, hereinafter "application", such as a windowing-type environment application or a DOS-type environment application.

Figure 2:
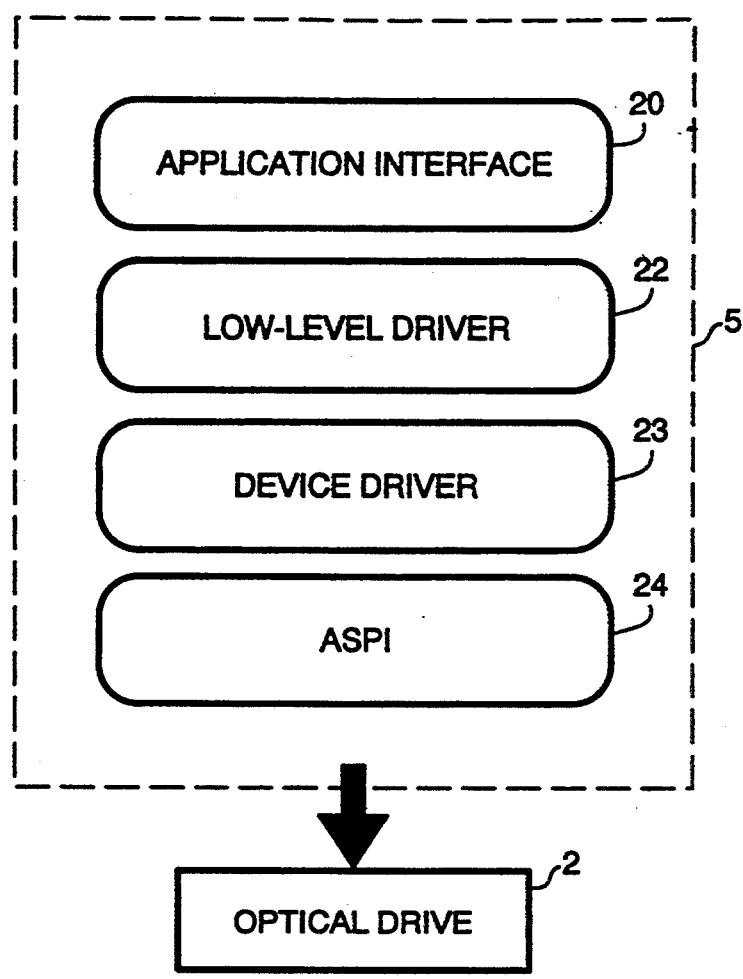
FIG. 2 is a functional block diagram of an application interface with the optical memory card drive.

As shown in FIG. 2, the operator designated application communicates through an interface which comprises an application interface 20, low level driver 22, device driver 23, and an Adaptec® Advanced SCSI Programming Interface (ASPI) 24. Work station 3 interfaces with optical drive 2 by requests sent from the application to application interface 20 to low level driver 22.

Requests from the application, such as those listed on the attached appendix, are routed from application interface 20 to low level driver 22. Low level drier 22 carries out each request by either performing the designated task itself (i.e., writing to the hard drive) or by routing the command to device driver 23 to send a command function designated to optical drive 2 via ASPI 24. Thereafter, the request is sent across SCSI port 14 to optical drive 2. In accordance with the command from device driver 23, optical drive 2 either writes to optical memory card 1 or reads data from optical memory card 1.

The application determines the attributes of the optical memory card and the type of format to be used for accessing the card, for dividing the card into partitions, and for designating portions of the card to be data storage areas. Low level driver 22 performs the above operations in accordance with the application requirements.

Figure 3:
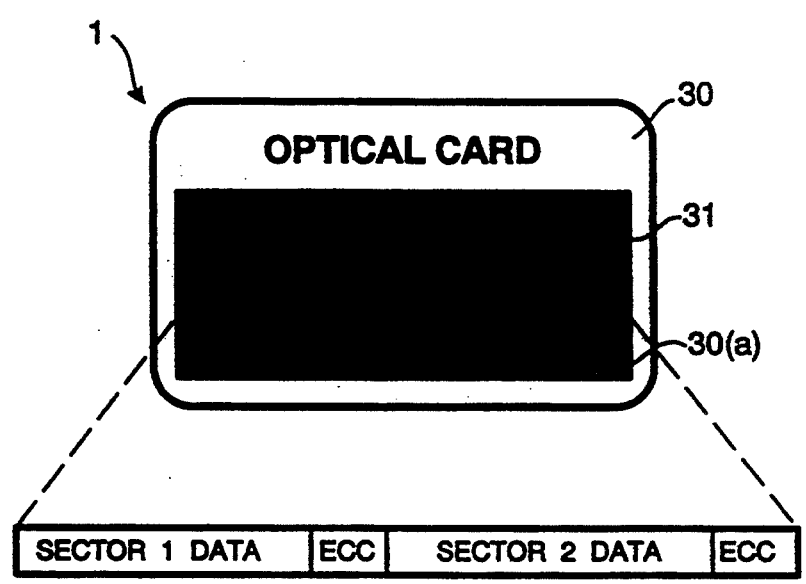
FIG. 3 is a general representational view of an optical card of the present invention.

As shown in FIG. 3, optical memory card 1 includes at least two sections: card directory 30 and card data area 31. Alternatively, there may be provided a secondary card directory 30a which maintains all of the same directory information stored in card directory 30 but in a logical mirror image rather than a physical mirror image of data stored in card directory 30. In this manner, user data on the card will be available if either card directory 30 or 30a is damaged. However, for the purposes of discussing the present invention, only card directory 30 will be discussed.

The optical card is divided into plural laterally spaced apart tracks which run along the longitudinal direction of the card. Typically, about 2,500 such tracks are provided. As shown in FIG. 3, each track, whether in directory areas or data areas, is divided into one or more sectors with each sector being terminated by an optional error correction code ("ECC") area. The application determines the number of sectors per track, whether ECC is enabled for the storage of data and the number of card partitions. Low level driver 22 then sets up card directory 30, and formats the card. As shown in FIG. 4, low level driver 22 creates card directory format 30 with a first field 41 of fixed directory information and a second field 42 of updatable directory information. Fixed directory field 41 is created during initial formatting of optical memory card 1 and is not updated thereafter. On the other hand, updatable directory field 42 is updated whenever a file in optical memory card 1 is updated or when a portion of the updatable directory field 42 requires updating.

Card directory 30 defines the layout of optical memory card 1 and defines the regions to which data is written. The format information which defines these regions are stored in both directory fields. The following description details the type of information stored in each card directory 30.

Upon initialization, low level driver 22 generates a 6-character randomly generated identifier and stores the number in fixed directory field 41 at reference numeral 43. This number will identify the file and will be utilized by low level driver 22 when accessing the file. During initialization, low level driver 22 determines the type of optical memory card utilized in the system and sets the card type at reference numeral 44. A card identifier label is provided at reference numeral 45 and an optional user-generated card name can be input by the user at reference numeral 45. Low level driver 22 defines the type of formatting in fixed directory field 41 indicated at reference numeral 46 which provides partitions on the card. Once formatting of the fixed directory field 41 is completed, the fixed field directory size is set at reference numeral 50 by low level driver 22.

Updatable directory field 42 includes attribute features which describe items that are normally updated after each write operation to optical memory card 1. For example, updatable directory field 42 includes the size of the updatable directory at reference numeral 52. A description of all updates which have been made to optical memory card 1 are indicated by a revision number. The highest revision number indicates the latest and most accurate update of the optical memory card at reference numeral 53.

Updatable directory field 42 is read by optical drive 2 and low level driver 22 determines a next location on optical memory card 1 to write data. Updatable directory field 42 contains next sector information at 55 which sets a next allocatable sector number for the next sector to be allocated for data. Start-of-file-table 56 provides an index of the first sector of each file stored on the optical memory card 1. In this manner, a file can be readily accessed by locating the first sector of a designated file. Updatable directory field 42 also includes a table of all deleted files at 56 and a table of each bad sector on optical memory card 1 at reference numeral 58.

Optical memory card 1 may also have a security feature which requires a user to set a user password used to access data stored on the optical memory card 1. The password is contained in the updatable directory field 42 at reference numeral 59 thereby restricting use of optical memory card 1 to designated users.

When optical memory card 1 is accessed, only updatable directory field 42 of card directory 40 is read and stored on PC 5 of work station 3 in a virtual image journal (to be described in more detail hereinbelow). In this manner, only those portions of updatable directory field 42 will be updated on optical memory card 1 rather than entirely updating card directory 30.

Reverting back to FIG. 3, card data section 31 contains data files of user data. Each file has a unique name and consists of one or more extents of data. Each extent includes a self-defining extent header and is made up of one or more contiguous sectors, wherein the number of sectors in each extent is dependent upon the number of sectors used in the extent before closing a file and writing the file to optical memory card 1.

As an optimization of card directory 30, updatable directory field 42 may contain information regarding the next extent location for a file and a description of the size of each extent. Accordingly, by scanning updatable directory field 42, low level driver 22 can quickly establish the size of a file and subsequent extents of the file rather than reading each extent header.

Once the card directory 30 has been formatted and defined by the application, a user may create a file. The driver creates attribute definition lines for each extent header in the file and completes each line as the file is created. An example of an extent header format is shown at FIG. 5. Each extent header includes the size of the header at reference numeral 61, a revision number at reference numeral 62 (the revision number is incremented by 1 after each revision) a file identifier which includes a file name at reference numeral 63, and the size of the extent to indicate the amount of sectors used by data in the file at reference numeral 64.

Extent header 60 also includes an extent pointer at reference numeral 65 which indicates the next location at which an extent exists for that file. Thus, upon reading next extent pointer 65, it is possible to determine where on the card further data for the file may be located.

When creating a file, a blank extent must be pre-allocated at the time of creation of the file since it is not possible to revise data once it has been written to optical memory card 1. Therefore file header 50 must include a pointer to an extent. In addition, file header 60 includes a location for inserting a calendar date corresponding to the date of the latest modification to the file at reference numeral 67. There is also provided a user comment area at reference numeral 68 which allows the user to identify and define the content of the file. It is noted that user comment area 68 is not read as part of the data stored in PC 5 upon reading a file header, but rather a separate command is required to access user comment area 68. The descriptions stored in file header 60 allows the driver to quickly identify the start of the extent, the size of the extent, and the location of the next extent for the file.

Figure 6A:
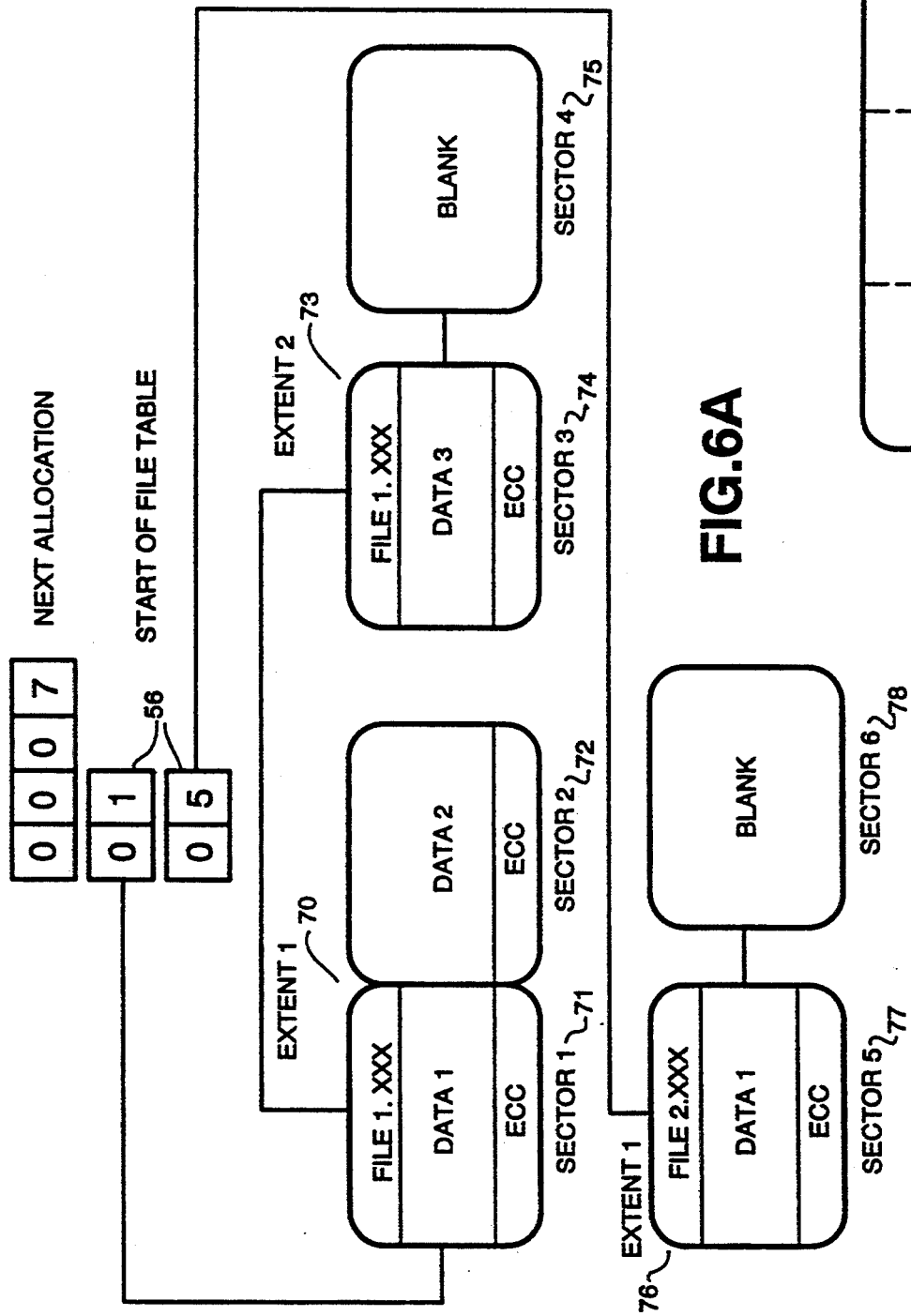
FIGS. 6a and 6b illustrate functional block diagrams used for explaining a logical structure of files on the optical memory card.
Figure 6B:
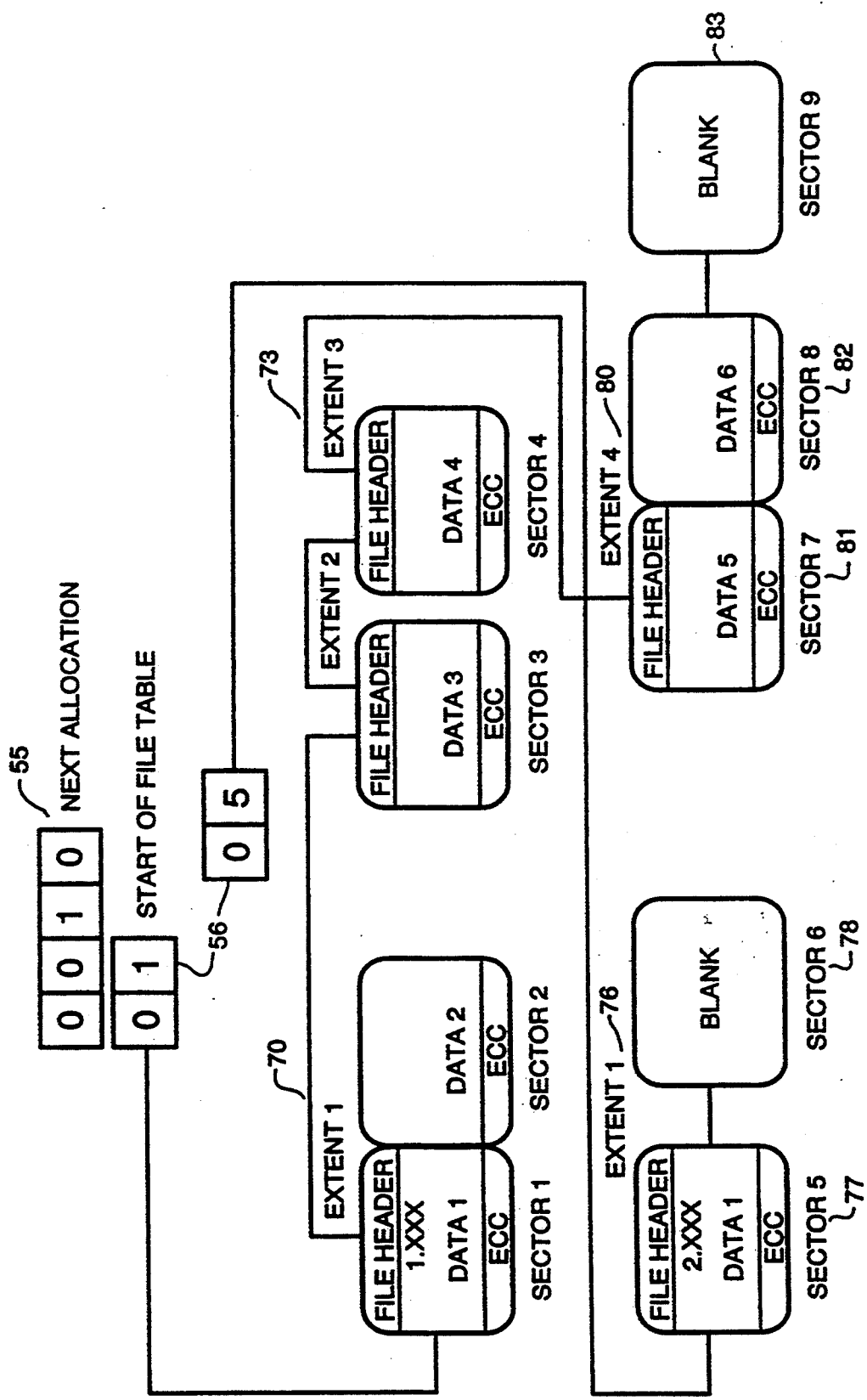

FIGS. 6a and 6b illustrate the manner in which card directory 30 and file header 60 are used to access data in the present system.

FIG. 6a is a representative view of the configuration of file extents stored on optical memory card 1 as it appears on the card. In this example, optical drive 2 reads card directory 30 to determine the sector in which each file starts by looking at start-of-file-table 56. In the present example, start-of-file-table 56 shows that files begin at sector 1 and sector 5. Beginning at sector 1, file 1.XXX includes a first extent 70 consisting of sectors 1 and 2 at reference numerals 71 and 72, respectively. The extent header for the first extent includes a pointer to a second extent at reference numeral 73 consisting of data sector 3 at 74. Finally, the extent header for the second extent includes a pointer to a blank third extent at sector 4 (reference 75). In the case that data is to be appended to file 1.XXX, the blank extent can be used to add the data at which time an extent header will be created which points to the next succeeding extent.

Similarly, file 2.XXX has two extents that contain logical sector 5 at reference numeral 77, and a blank extent at sector 6 shown at reference numeral 68.

FIG. 6b shows the same card after data has been added to file 1.XXX. Start-of-file-table 56 remains unchanged even though next allocatable sector table 55 indicates that the next allocatable sector begins at sector 10. In this case, file 1.XXX has been updated with data in blank sector 75 which becomes extent 3 in file 1.XXX 70. Further updates to file 1.XXX 70 created extent 4 at reference numeral 80. Extent 4 was created at non-contiguous sector 7 because file 2.XXX is disposed between these extent files. Nevertheless, extent header 60 for extent 3 provides pointer to next extent 65 which would provide sector 8 as the next extent location.

FIG. 6c illustrates a user's view of optical memory card 1 as illustrated in FIG. 6a. As shown in FIG. 6c, the user views file 1.XXX as a set of contiguous bytes which contain data 1, data 2, and data 3.

The operation of storing data to optical memory card 1 will now be described.

In general, after inserting the optical memory card into optical drive 2 and after accessing of optical memory card 1, optical drive 2 locks the card into the drive unit until either all the files are closed or an eject command is issued through low level driver 22. The eject command issued by the application may be issued to either commit all data to the card or to ignore all changes to the card.

After optical memory card 1 is accessed, the application will attempt to read card directory 40 from optical memory card 1. Optical drive 2 will begin its read from a first sector on a first track and continue reading data until either blank blocks are found or an end of card header track is reached. In the case of a first and second directory existing on the card, data from the primary and secondary directories will be compared to see if both contain valid data. A revision number in card directory 30 is incremented after every write operation and only the directory with the highest revision number indicates the latest directory on optical memory card 1.

Figure 6D:
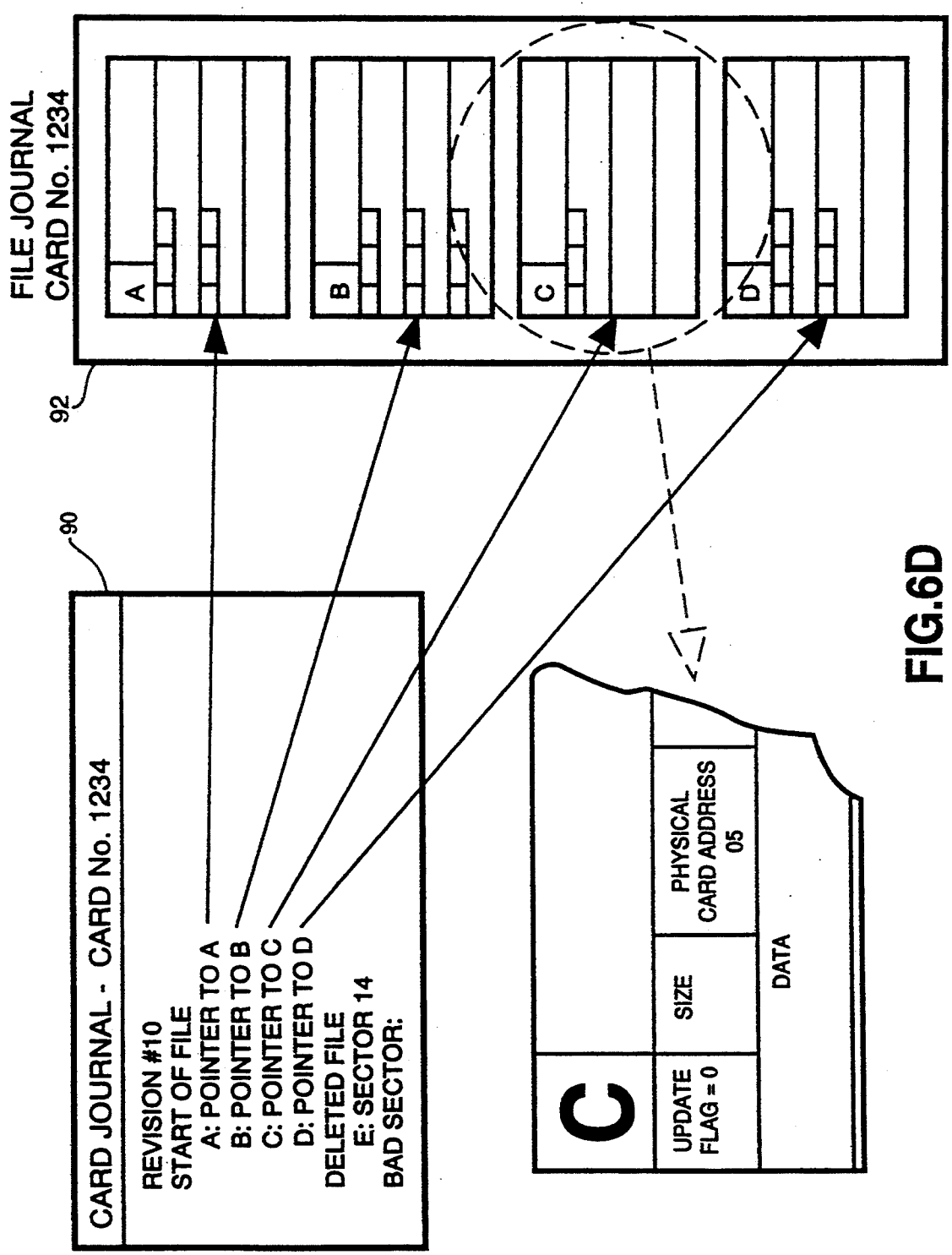
FIG. 6d is a general representational view of a card journal and file journal stored on the PC.

After the card directory has been read, low level driver 22 creates a card journal 90 on PC 5, as shown in FIG. 6d, and stores the card journal on its internal RAM or disk drive. Card journal 90 is part of a virtual image that PC 5 creates for the optical card.

As shown in FIG. 6d, card journal 90 includes entries which are similar to entries in card directory 30. However, instead of having sector addresses in the start-of-file-table, card journal 90 has pointer locations to the start of files on the disk drive or in RAM. In this regard, the virtual image also contains file journal 92 which is the virtual image of files on optical memory card 1.

File journal 92 is a temporary journal of files. The journal is an image of either newly created files in the virtual image, files which have been read from optical memory card 1 to be updated in the virtual image, or both. In FIG. 6d, file journal 92 includes images of each file such as File A, File B, File C, and File D. Each file contains header information for each extent and each header extent includes size data, physical address on card information, and an update flag. As illustrated in the expanded view of File C, the extent header for File C indicates that the extent update flag is set to 0, the extent size is 17, and the extent's physical address on the card resides at sector 5. In the case that File C is updated, the extent header will be updated to reflect a change and the update flag indicator will be set.

Once the card has been read, a user can enter a request either to create a new file to update an existing file, or read an existing file. If the user selects the option to create a new file, the next writable sector will be located in accordance with the next sector attribute 55 in updatable directory field 42 of card header 30. The new file is written to file journal 92 as shown in FIG. 6d, and file journal 92 is created in the virtual image for the new file. However, if the user desires to update an existing file, the indicated file can be located by reviewing the start-of-file-table attribute 56 in updatable directory field 42 of card directory 30. Upon locating the file, the file is stored to PC 5 and it is entered into file journal 92 in the virtual image of optical memory card 1. Thereafter, all updates to the file are made to the corresponding file in file journal 92 in the virtual image.

When a user selects an option to create a file, file header 60 is created and data to be stored in the file is buffered to PC 5 to update both main journal 90 and file journal 92 in the virtual image. The virtual image resides on PC 5 until a request is made to close all files and eject optical memory card 1. At this point, all data is compiled and routed through SCSI interface 14 to optical drive 2. Optical drive 2 writes the data to designated sectors of optical memory card 1 in accordance with next allocatable sector line 55 in updatable directory field 42.

Figure 7B:
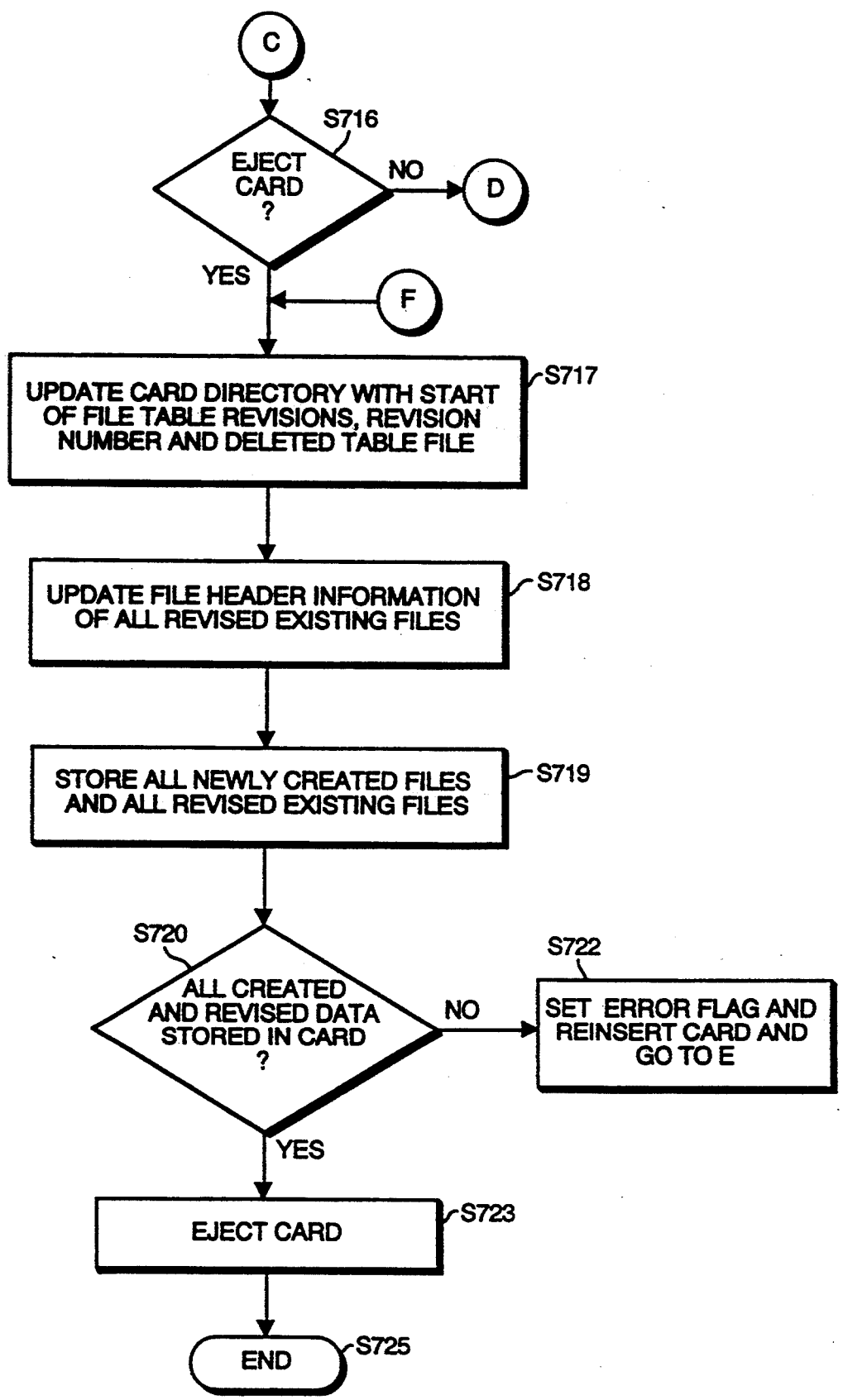
Figure 7C:
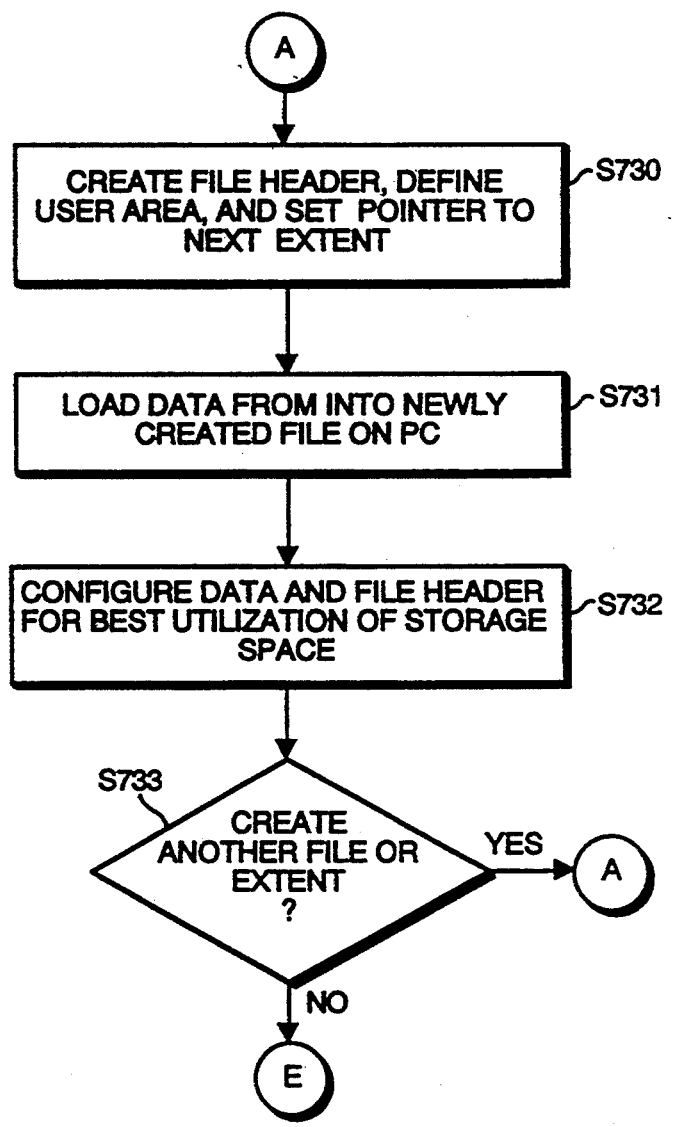
Figure 7D:
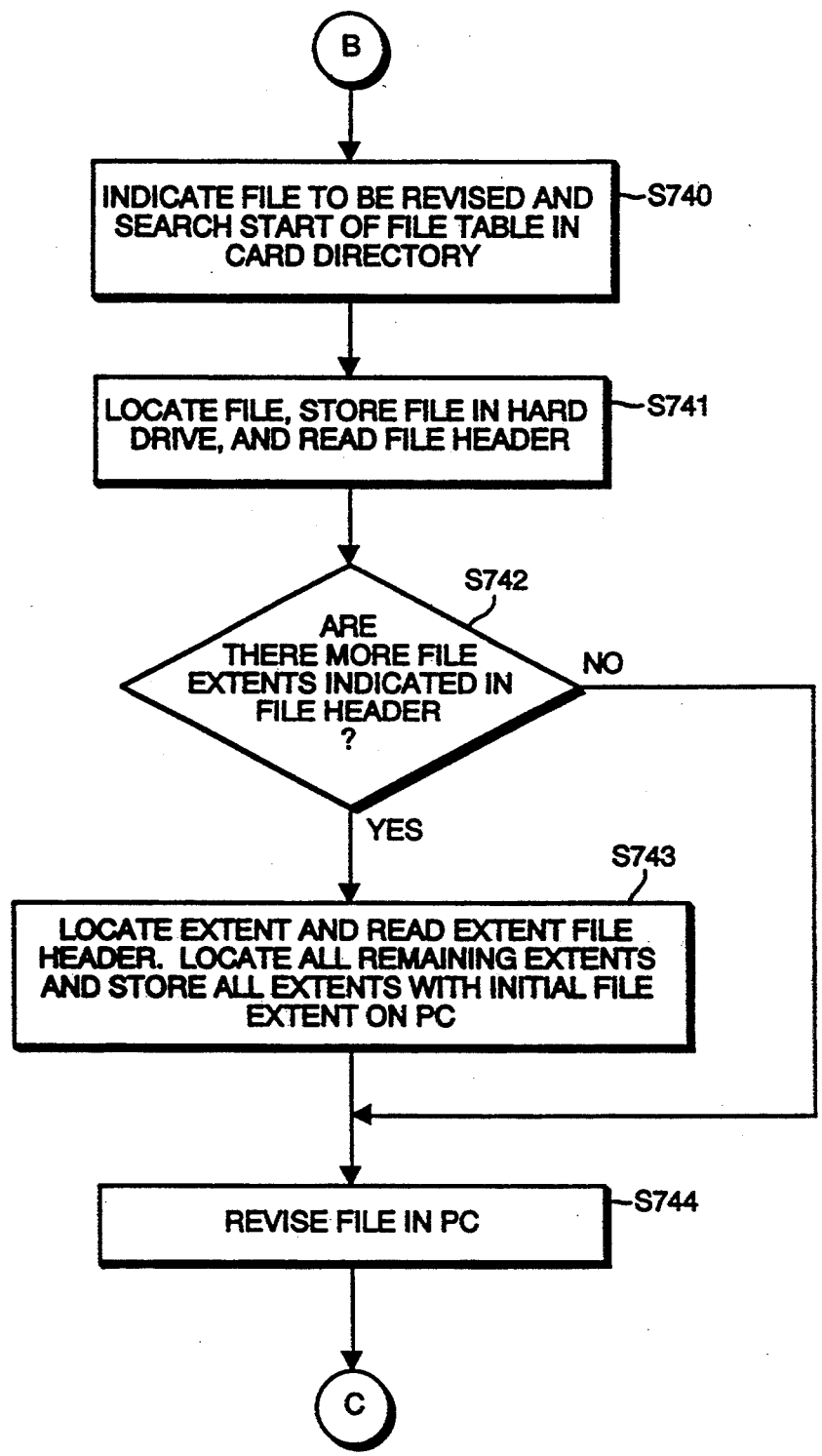

FIG. 7 illustrates this process in more detail. In step S701, the optical memory card 1 is inserted into optical drive 2. In step S702, the user enters commands to access optical memory card 1 and upon accessing the card, low level driver 22 determines whether a password is required to access optical memory card 1 in step S703. In the case that a password is required, low level driver 22 determines whether optical card 1 has been formatted previously in step S705. However, if the card has not been formatted previously, then in step S706 an indicator is sent to the user and, in step S707, low level driver 22 is instructed by the application to format the optical memory card and create card directory 30.

On the other hand, if it is determined that optical memory card 1 has been previously formatted, in step S708 the password is checked for verification. In the case that the password is not identified in step S708, the interface between the work station 3 and optical drive 2 is disconnected in step S709. However, in the case that the password is verified, flow proceeds to step S710 at which point card directory 30 is read and the latest revision number 53 of updatable directory field 42 is examined and the latest update of the card directory is stored onto PC 5. Once updatable directory field 42 of card directory 30 is stored in step S712, the software application prompts the user and inquires if a new file should be created. If the user desires to create a new file at this time, flow jumps to step S730. In step S730, file header 70 is created by the application. It is during the creation of file header 70 that the user enters comments or descriptions desired to describe the file type.

Once the application creates the file, data can be stored to the file in the virtual image stored on PC 5 in step S731. The attributes stored in file header 70 and data are compiled so as to best utilize storage space in step S732. In step S733, the application software queries the user and inquires if another file should be created or whether an extent for a previous file should be created. In the case that another extent is to be created, flow returns to step S730. However, in the case that another file or another extent is not created, flow returns to step S714. In step S714, the user is queried by the software application as to whether an existing file should be revised. If the user selects to revise a new file, flow jumps to step S740 at which point the user designates the file to be revised.

Once the desired file has been indicated by the user, optical drive 2 searches start file table 56 in updatable directory field 42 of card directory 30 for the beginning sector of the desired file. In step S741, optical drive 2 locates the file, stores the file in the virtual image created on PC 5. After the file is stored on PC 5, file header 70 is reviewed for file attributes and in step S742 a determination is made as to whether there are more file extents appended to that file. In the case that there are further extents, in step S743 the extent is located on optical memory card 1 and the extent is loaded onto PC 5. However, if optical drive 2 does not locate an extent, flow jumps to step S744. In step S744, the file and/or extents can be updated and flow returns to step S716.

In step S716, the user is queried as to whether both the updates to optical memory card 1 can be stored and the optical memory card rejected. If the operator returns with a negative answer, then flow returns to step S712. However, in the case that the user returns with a positive answer, in step S717 those portions of the virtual image stored on PC 5 which have been updated are downloaded to low level driver 20 to device driver 22 which in turn transmits to optical drive 2 only those updated portions of optical memory card 1 corresponding to the updated portions of the virtual image. In step S718 file header information of all updated existing files are updated as well and in step S719, all newly created files and all updated existing files are stored onto optical memory card 1.

In step S720, a restoration feature of the system determines whether all of the newly created and/or revised data has been completely stored in optical memory card 1. For example, during the write process to optical memory card 1, power is suddenly interrupted. Data which has not been stored to optical memory card 1 is flagged in step S722 and an error message is sent to the user. The error message is displayed to the user and the user is requested to reinsert optical memory card 1 for the purpose of completing the storage of data. In the case that all data is not stored in step S722, flow would return to step S717. On the other hand, if data was satisfactorily stored in step S720, then in step S723 optical memory card 1 is ejected and the program ends in step S725.

Figures 8, 8A:
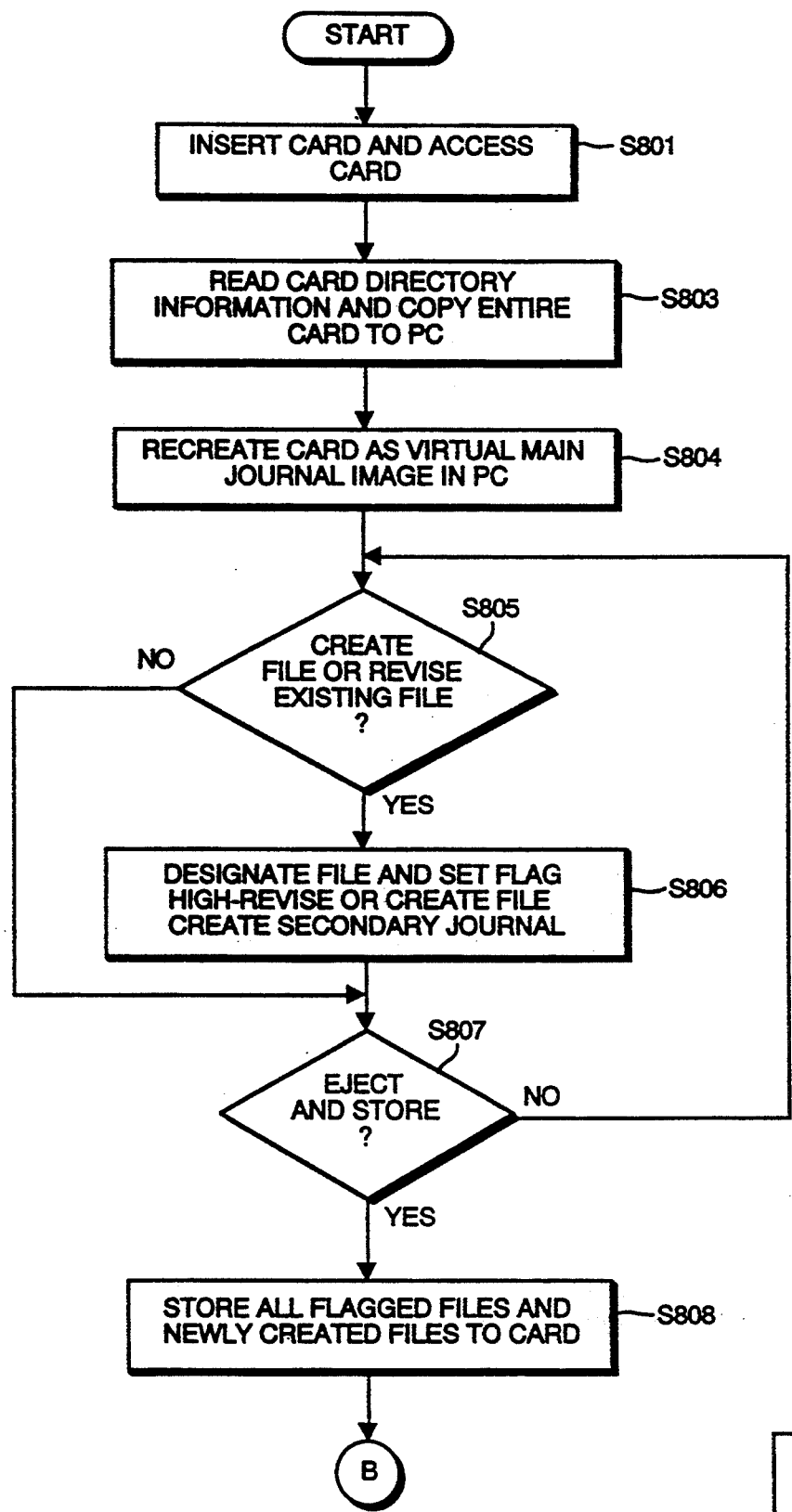
FIG. 8 shows a flow diagram that illustrates the manner in which a virtual image of the optical memory card is created on the PC.
Figure 8B:
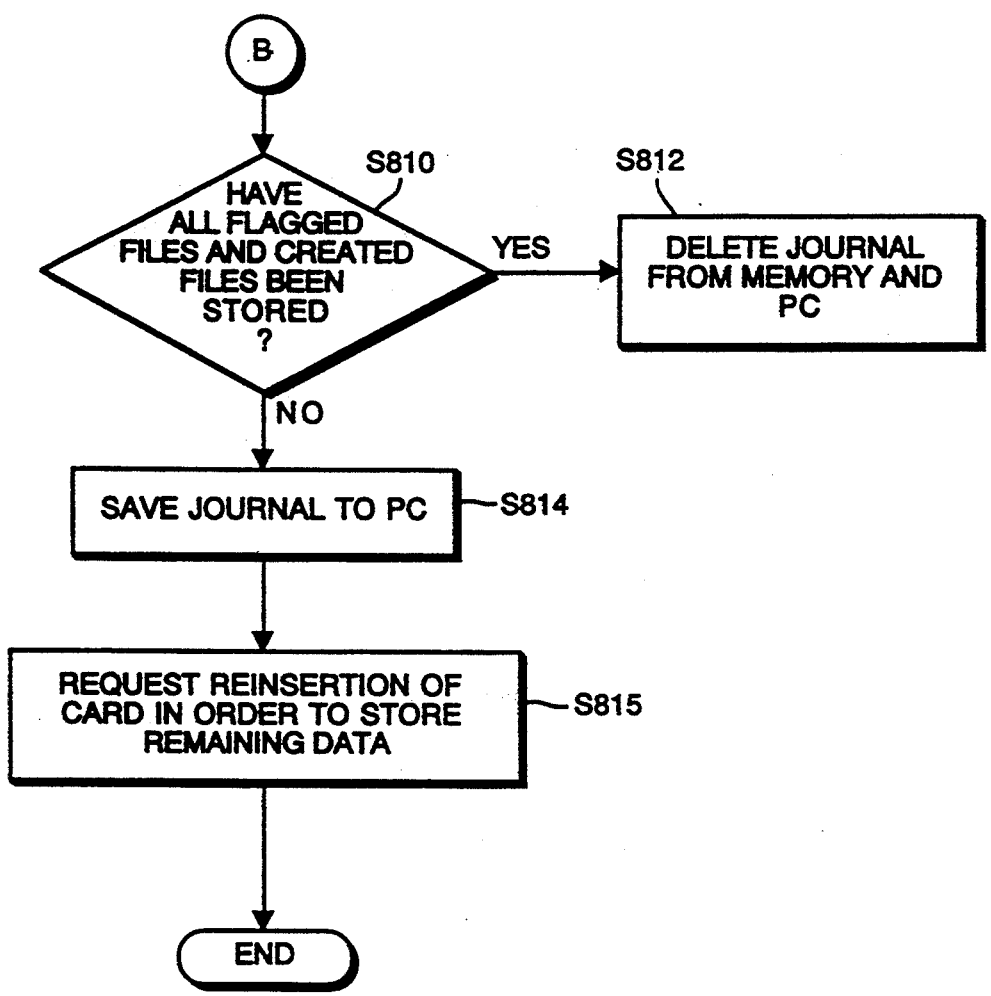

The feature of creating a virtual image of the optical memory card on PC 5 referred to earlier will be discussed in more detail with respect to the flow diagram illustrated in FIG. 8.

A virtual image of the optical memory card 1 is created in order to improve performance of data transfer to/from the card and to/from the application, and to provide better utilization of space on optical memory card 1 for storing data. Low level driver 22 buffers all write commands to memory until either an eject command is entered by the user. Buffering of write commands will occur in such a manner that recovery of data can be accomplished in the case that the buffered data cannot be stored on the optical memory card.

After optical memory card 1 is inserted and accessed in step S801, the card is read and card directory 40 is reviewed for the attributes of the card. At this point, updatable directory field 42 is stored in a virtual image on PC 5 as a card journal. The card journal 90 for that card is identified by the serial number stored in updatable directory field 42. In step S804, the virtual image is created on PC 5. In step S805, if a new file is to be created or an existing file is to be updated, a file journal 92 is created to store all file data and file header information. Newly created data in the file journal 92 is flagged. For example, in the case of a new file, a file header is flagged on the virtual image or, in the case of an existing file, only those portions in the file header which have been updated are flagged which have not been previously stored on optical memory card 1 in step S806. However, in the case that a new file is not created or an existing file is note revised, then flow advances to step S807 at which point the user is queried as to whether the optical memory card should be ejected. If the user returns a negative answer, flow returns to step S805. However, in the case that the user requests that the card be ejected in step S808, all flagged entries in each file journal 92 of the virtual image are stored to optical memory card 1. That is, those areas of updatable directory field 42, newly created files, file headers, and existing file headers are updated at this time.

In step S810, the recovery feature of the system determines whether there has been a power interrupt during the storing process and reviews the virtual image to determine whether there are any flagged items remaining in the virtual image which have not been written to optical memory card 1. If flagged files remain, then in step S814 file journal 92 of the virtual image is saved to the hard drive. In step S815, an error message is displayed to the user and a request to reinsert optical memory card 1 into optical drive 2 is displayed. However, in the case that all data has been saved, then in step S812 file journal 92 of the virtual image is deleted from the PC and flow advances to the end of the program.

The foregoing description has been provided with respect to a write once/read many optical memory card. However, it is to understood that the invention can be embodied with any write once/read many media and, in any application for storing data such as medical records, maintenance records, banking and financial records, etc.

APPENDIX: APPLICATION COMMANDS TO LOW LEVEL DRIVER

OC OpenFile

This function is used to open a file on the optical card and prepares it for reading and writing. If the function is successful a positive value (a pointer to an OCHANDLE) will be returned. If the function call fails, the client may call GetError to obtain the error code explaining the failure.

OCHANDLE *
OC_OpenFile(IpFileName,wOpenMode,IpPassword)

IpFileName pointer to a null terminated string containing the name of the file to be opened. If IpFileName contains the string "CARD" a handle to the entire (data read) of the card is provided on return and the client can now read the entire card as a single file.

wOpenMode word containing the mode file is to be opened in. The following possible values are:

| | |
|---|---|
| O_RDONLY | Read Only |
| O_WRONLY | Write Only |
| O_RDWR | Read And Write |
| O_APPEND | Writes occur at end of file each time |
| O_CREAT | If the file does not exist create it. |
| O_TRUNC | If the file exists set it's length to 0. |
| O_EXCL | Used with O_CREAT, if the file exists an error is returned. |
| O_RANDOM | Used with O_CREAT, create the file for random access writes. Not currently supported. |
| O_BINARY | Open file in Binary Mode |
| O_TEXT | Not provided |

IpPassword pointer to a null terminated string containing the password for the card. This pointer may be NULL if no password exists for the card.
Error Codes
OC_NO_SUCH_FILE
OC_ACCESS_DENIED
OC_INVALID_OPEN_MODE
OC_NO_SUCH_FILE
OC_FILE_ALREADY_EXISTS
OC_FILE_ALREADY_OPEN
OC_CARD_FULL
OC_NO_CARD_PRESENT
OC_CARD_NOT_FORMATTED
OC_IO_ERROR
OC CloseFile
This function is used to close a previously opened file.
ErcType OC_CloseFile(IpHandle)
IpHandle pointer to the OCHANDLE structure
Error Codes
OC_INVALID_HANDLE
OC Read
This function is used to read from the file and returns the number of bytes actually read. If the return value is 0 end-of-file was reached. If the return value is 0 a call should be made to GetError to find the actual cause of the error.
LONG OC_Read(IpHandle,pBuffer,iLen)
IpHandle pointer to the OCHANDLE structure.
pBuffer pointer to a buffer into which the data is read.
iLen is the number of bytes to be read.
Error Codes
OC_INVALID_HANDLE

OC_ACCESS_DENIED
OC_INVALID_MODE

OC Write

This function is used to write data to file and returns the number of bytes actually written. If the return value is 0, a call should be made to GetError to find the actual cause of the last error.

LONG Write(lpHandle,pbBuffer,iLen)

lpHandle pointer to the OCHANDLE structure.

pBuffer pointer to a buffer from which the data is written.

iLen is the number of bytes to be written.

Error Codes
OC_INVALID_HANDLE
OC_ACCESS_DENIED
OC_INVALID_MODE
OC_CARD_FULL

OC Seek

This function is used to seek a logical byte offset in the file.

ErcType OC_Seek(lpHandle,lOffset,iWhence)

lpHandle pointer to the OCHANDLE structure lOffset long, logical byte offset to seek to.

iWhence position to seek from. Possible values are

SEEK_SET—seek from beginning of file
SEEK_CUR—seek from current position
SEEK_END—seek from end of file Error Codes
OC_INVALID_HANDLE
OC_INVALID_OFFSET
OC_CARD_FULL OC GetError This function is used to return the error code for the last file operation. OC_GetError will return 0 in all cases unless an invalid handle was passed on it.

ErcType OC_GetError(lpHandle)

lpHandle pointer to the OCHANDLE structure

Error Codes
OC_INVALID_HANDLE

OC Delete

This function is used to delete a file.

ErcType OC_Delete(lpFileName)

lpFileName pointer to a null terminated string containing the name of the file to be opened.

Error Codes
OC_NO_SUCH_FILE
OC_ACCESS_DENIED
OC_INVALID_OPEN_MODE
OC_INVALID_FILE_NAME
OC_CREATE_ERROR
OC_NO_CARD_PRESENT
OC_CARD_NOT_FORMATTED
OC_IO_ERROR OC Eject This function is used to eject a card. If any files are currently open, an error code will be returned and the card will not be ejected.

ErcType OC_Eject(void)

Error Codes
OC_NO_CARD_PRESENT
OC_CANNOT_EJECT_CARD

OC GetFile

This function is to obtain the names of the files in a partition. Prior to calling this function for the first time for a partition lpWorkArea should be initialized to 0. The function should be called until the error code OC_NO_MORE_ENTRIES is returned. On returning from the call the name of the next file in the partition is returned to the caller. The FILE_INFO structure is also filled in by OCDRVCIS.

ErcType OC_GetFile(lpFileName,lpInfoStruct,lpWorkArea)

lpFileName pointer to buffer in which a null terminated string containing the name of the file will be copied.

lpInfoStruct pointer to buffer into which the FILE_INFO structure will be copied.

lpWorkArea pointer to a buffer (sizeof(WORD)) used by OCDRVCIS to iterate over the files in the partition. This should be initialized to 0 the first time this call is made for a partition. This area should not be modified by the client while making the calls to OC_GetFile.

Error Codes
OC_NO_MORE_ENTRIES
OC_ACCESS_DENIED
OC_NO_CARD_PRESENT
OC_CARD_NOT_FORMATTED
OC_IO_ERROR OC QueryFileStatus This function is used to obtain status information for a file on the card.

ErcType OC_QueryFileStatus(lpHandle,bQueryType,lpStatusReturn)

lpHandle pointer to the OCHANDLE structure bQueryType byte, type of status being queried. Possible values:

| QueryType | Structure |
|---|---|
| QUERY_FILE_DETAILS | struct FILE_INFO{ LONG lUsedSize; LONG lAllocationSize; LONG AccessDate; }; | lpStatusReturn pointer to a buffer in which the data is returned.

Error Codes
OC_INVALID_HANDLE

OC CardStatus

This function is used to obtain status information for the card.

ErcType OC_CardStatus(bQueryType,lpStatusReturn)

bQueryType byte, type of status being queried. Possible values:

| QueryType | Structure |
|---|---|
| QUERY_CARD_NAME | LPSTR lpCardName; |
| QUERY_CARD_SNUM | BYTE rgbSerialNum(16); |
| QUERY_FORMAT | FORMAT_STRUCT |
| QUERY_SIZE | struct PART_DETAILS { LONG lUsedSize; LONG lTotalSize; }; struct CARD_DETAILS { PART_DETAILS partition(8); | lpStatusReturn pointer to a buffer in which the data is returned.

Error Codes
OC_INVALID_HANDLE

OC WriteUserData

This function is used to write the user data area of a file. This area is available to be written to only once and must be done following the file creation and before any buffered writes are written to the card and the file is closed. The return value is the number of bytes actually written or −1 indicating an error. If an error occurs a call should be made to GetError to obtain the actual value of the error code.

INT OC_WriteUserData(IpHandle,pUserData,iLen)

IpHandle pointer to the OCHANDLE structure.

pUserData pointer to a buffer from which the user data is written.

iLen is the number of bytes to be written.

Error Codes
OC_INVALID_HANDLE
OC_ACCESS_DENIED
OC_CANNOT_WRITE_DATA

OC ReadUserData

This function is used to read the user data area of a file. The return value is the number of bytes actually read or −1 indicating an error. If an error occurs a call should be made to GetError to obtain the actual value of the error code. INT OC_ReadUserData(IpHandle,pUserData,iLen)

IpHandle pointer to the OCHANDLE structure.

pUserData pointer to a buffer to which the user data is read.

Error Codes
OC_INVALID_HANDLE
OC_ACCESS_DENIED
OC_CANNOT_READ_DATA

OC SetPassword

This function is used to set a password for the card. If a password for the card exists, the old password must be provided for the new password to be set.

ErcType OC_SetPassword(IpOldPassword,IpNewPassword)

IpOldPassword pointer to null terminated string containing the old password, can be NULL if no password exists.

IpNewPassword pointer to null terminated string containing the new password.

Error Codes
OC_NO_CARD_PRESENT
OC_INVALID_OLD_PASSWORD
OC_PASSWORD_TOO_LONG

OC FormatCard

This function is used to format the optical card. The card may be partitioned to have at most seven partitions. For each partition the client must specify whether ECC is to be used for that partition and the number of tracks in that partition. The total of all the tracks in the must equal MAX_USER_TRACKS.

ErcType OC_FormatCard_(FORMAT_STRUCT*)

```
typedef struct {
   WORD wTracks;           // # tracks in this partition
   BYTE bPartitionType;    // values 0-7
   FLAG fUseECC;           // 1 = yes
} PARTITION_DEFN;
typedef struct {
   WORD wRevision;         // revision number of struct
   char CardName(9);       // user defined card name
   char Password(9);       // password if any
   BYTE bPartitions;       // # Partitions
   PARTITION_DEFN
   pPartition(8);          //partition information
```
} FORMAT_STRUCT;

Error Codes
OC_NO_CARD_PRESENT
OC_CARD_ALREADY_FORMATTED
OC_IO_ERROR
OC_TOO_MANY_PARTITIONS
OC_INVALID_TRACK_COUNT
OC_ACCESS_DENIED OC Open This function is used to open the optical card. This function must be called prior to calling the other functions for a card that has already been partitioned. If the correct password is supplied via this call, it does not have to be provided in subsequent OC_Open file calls.

ErcType OC_Open(LPSTR IpszPassword)

IpszPassword pointer to null terminated string containing the password.

Error Codes
OC_NO_CARD_PRESENT
OC_CARD_NOT_FORMATTED
OC_IO_ERROR
OC_ACCESS_DENIED OC SetPartition This function is used to set the current partition.

ErcType OC_SetPartition(bPartition)

bPartition is the partition number to set the current partition to.

Error Codes
OC_NO_CARD_PRESENT
OC_CARD_NOT_FORMATTED
OC_IO_ERROR
OC_INVALID_PARTITION OC PartitionCountIs This function returns the number of partitions. BYTE OC_PartitionCountIs(void)

What is claimed is:

1. A method for updating data stored in a write once/read many memory, the method comprising the steps of:

creating a complete virtual image of data stored in the write once/read many memory;

updating data in the complete virtual image of the write once/read many memory and designating updated data in the complete virtual image; and writing designated updated data from the complete virtual image to the write once/read many memory, wherein said creating step creates a main journal to organize file information on the write once/read many memory, and creates file journals, each containing a self-describing extent header for providing address information to a next extent of the file, in correspondence to files stored on the write once/read many memory, and wherein said updating step adds extent headers to sequentially contiguous blocks of memory and updates file organization information in the main card journal in correspondence to each added extent.

2. A method according to claim 1, wherein the file journals contain self-describing extent headers and a flag for designating updated data, said flag being set in said updating step.

3. A method according to claim 2, wherein the writing step writes designated updated data in accordance with the flag.

4. A method according to claim 3, wherein the writing step updates data and writes file organization data to the write once/read many memory.

5. A method according to claim 1, wherein the creating step creates the complete virtual image on a randomly accessible read/write storage medium.

6. A method according to claim 1, further comprising the steps of inserting the write once/read many memory into read/write device and locking it therein.

7. A method according to claim 6, further comprising the step of ejecting the write once/read many memory from read/write device, wherein said writing step is performed only once in accordance with ejection of the write once/read many memory.

8. A method according to claim 7, wherein in response to an improper ejection, the complete virtual image is saved in an external memory.

9. A method for maintaining a complete virtual image of a write once/read many optical memory card in an external memory device which includes a read/write device, the method comprising the steps of:
  storing data from the write once/read many optical memory card to the external memory device;
  designating in the external memory device a file to be updated;
  updating data within the designated file stored in the external memory;
  updating a file on the write once/read many optical memory card corresponding to the designated file in the external memory in accordance with an update to the designated file; and
  maintaining a complete virtual image of the write once/read many optical memory card in the external memory device,
  wherein, in the updating step of updating a file in the write once/read many optical memory card, an update operation is performed only once in response to an election signal.

10. A method of storing and accessing information on a write once/read many optical memory card, the method comprising the steps of:
  formatting a write once/read many optical memory card;
  creating a directory containing a start of file extent pointer and a next allocatable sector; and
  creating an extent header for each extent of each file, wherein the extent header contains self-describing attributes of its corresponding extent, and contains a number of contiguous bytes of the file and an address of a next extent.

11. A method according to claim 10, wherein the formatting step formats an option of selecting error correction coding for said optical memory card.

12. A method according to claim 10, wherein the directory is updated to reflect next allocatable address and, in the case a file is deleted, start of file pointers are indicated as being deleted from the directory.

13. A method according to claim 12, wherein a last extent for each file is a blank sector which contains no extent header.

14. A method according to claim 13, wherein the next allocated address in the directory is a next sector following the blank sector of a last file.

15. An apparatus for updating data stored in a write once/read many memory, comprising:
  creating means for creating a complete virtual image of data stored in the write once/read many memory;
  updating means for updating data in the complete virtual image of the write once/read many memory and designating updated data in the complete virtual image; and
  writing means for writing designated updated data from the complete virtual image to the write once/read many memory,
  wherein the creating means creates a main card journal to organize file information on the write once/read many memory, and creates file journals, each containing a self-describing extent header providing address information to a next extent of the file, in correspondence to files stored on the write once/read many memory, and wherein said updating means adds extent headers to sequentially contiguous blocks and updates file organization information in the main card journal in correspondence to each added extent.

16. An apparatus according to claim 15, wherein the writing means writes designated updated data in accordance with the flag.

17. An apparatus according to claim 15, wherein the creating means creates the complete virtual image on a randomly accessible read/write storage medium.

18. An apparatus according to claim 17, wherein the writing means writes both updated data and file organization data to the write once/read only memory.

19. An apparatus according to claim 18, further comprising ejecting means for ejecting the memory from read/write device, wherein said writing means is performed only once in accordance with ejection of the memory.

20. An apparatus according to claim 19, wherein in response to an improper ejection, the complete virtual image is saved in an external memory.

21. An apparatus according to claim 15, further comprising inserting means for inserting the write once/read many memory into read/write device and locking means for locking it therein.

22. An apparatus for maintaining a complete virtual image of a write once/read many optical memory card in an external memory device which includes a read/write device, comprising:
  storing means for storing data from the write once/read many optical memory card to the external memory device;
  designating means for designating in the external memory device a file to be updated;
  updating means for revising data within the designated file stored in the external memory;
  updating means for updating a file on the write once/read many optical memory card corresponding to the designated file in the external memory in accordance with an update to the designated file; and
  maintaining means for maintaining a complete virtual image of the optical memory card in the external memory device,
  wherein the updating means, for updating a file on the write once/read many optical memory card, performs an update operation only once in response to a signal to eject the write once/read many optical card from the read/write device.

23. An apparatus for storing and accessing information on a write once/read many optical memory card having at least one file which includes at least one extent of data, comprising:

formatting means for formatting an optical memory card;

creating means for creating a directory containing a start of file extent pointer and a next allocatable sector; and creating means for creating a header for each extent of each file, wherein the extent header contains self-describing attributes of the at least one extent, and contains a number of contiguous bytes of the at least one file and an address of a next extent.

24. An apparatus according to claim 20, wherein the formatting means formats an option of selecting error correction coding for said optical memory card.

25. An apparatus according to claim 20, wherein the directory is updated to reflect next allocatable address and, in the case a file is deleted, start of file pointers are indicated as being deleted from the directory.

26. An apparatus according to claim 23, wherein a last extent for each file is a blank sector which contains no extent header.

27. An apparatus according to claim 26, wherein the next allocatable address in the directory is the next sector following the blank sector of the last file.

28. A system for updating directory information and data on a write once/read many optical memory card, comprising:

a write once/read many optical drive device;

a write once/read many optical memory medium;

a computer interfaced to the write once/read many optical drive device, the computer including means for storing an application program which includes accessing commands to access the write once/read many optical drive device; and a driver responsive to the accessing commands, the drive including process steps for creating a complete virtual image of data stored in the optical memory medium, updating data in the complete virtual image of the optical memory medium, designating updated data in the complete virtual image, and writing designated updated data from the virtual image to the optical memory medium, wherein said driver performs the step of writing designated updated data to the write once/read many optical memory medium only once in response to an ejection signal.

29. A method for updating data in a write once/read many memory, the method comprising the steps of:

creating a card directory of a complete virtual image of files stored in the write once/read many memory, the card directory including a fixed directory field and an updatable directory field;

creating a file journal in the virtual image for files stored on the write once/read many memory, the file journal including size of file data, revision number of file, file name, pointer to a file extent, a date of last revision, and user-definable comment area;

updating data in files stored in the write once/read many memory and updating the updatable directory field and the file header in accordance with updates made to the files; and writing the card directory, and updated files to the write once/read many memory, wherein the step of writing designated updated data to the optical memory medium is performed only once in response to an ejection signal.

* * * * *

UNITED STATES PATENT AND TRADEMARK OFFICE
CERTIFICATE OF CORRECTION

PATENT NO. : 5,437,012

DATED : July 25, 1995

INVENTOR : Rakesh Mahajan

It is certified that error appears in the above-identified patent and that said Letters Patent is hereby corrected as shown below:

COLUMN 3

Line 53, "drier 22" should read --driver 22--.

COLUMN 5

Line 58, "header 50" should read --header 60--.

COLUMN 13

Line 24, "code. INT" should read
--code.
    INT--; and

Line 55, "Card___" should read --Card--.

COLUMN 14

Line 37, "partitions. BYTE" should read
--partitions.
    BYTE--.

COLUMN 15

Line 1, "claim 3," should read --claim 2,--;
Line 38, "election" should read --ejection--; and
Line 58, "claim 12," should read --claim 10,--.

UNITED STATES PATENT AND TRADEMARK OFFICE
CERTIFICATE OF CORRECTION

PATENT NO. : 5,437,012

DATED : July 25, 1995

INVENTOR : Rakesh Mahajan

It is certified that error appears in the above-identified patent and that said Letters Patent is hereby corrected as shown below:

COLUMN 17

Line 11, "claim 20," should read --claim 23,--; and
Line 14, "claim 20," should read --claim 23,--.

COLUMN 18

Line 2, "drive" should read --driver--.

Signed and Sealed this

Nineteenth Day of December, 1995

Attest:

BRUCE LEHMAN

Attesting Officer

Commissioner of Patents and Trademarks